(12) United States Patent
Schweitzer

(10) Patent No.: US 8,668,390 B2
(45) Date of Patent: Mar. 11, 2014

(54) RADIAL SHAFT SEAL WITH RETAINING DEVICE FOR A TENSION SPRING

(76) Inventor: Ferdinand Schweitzer, St. Peter in der Aus (AT)

( * ) Notice: Subject to any disclaimer, the term of this patent is extended or adjusted under 35 U.S.C. 154(b) by 30 days.

(21) Appl. No.: 13/297,366

(22) Filed: Nov. 16, 2011

(65) Prior Publication Data
US 2012/0134613 A1    May 31, 2012

(30) Foreign Application Priority Data
Nov. 19, 2010  (DE) .......................... 10 2010 044 177

(51) Int. Cl.
*F16C 33/78* (2006.01)
*F16J 15/32* (2006.01)

(52) U.S. Cl.
USPC .......................................... 384/484; 277/577

(58) Field of Classification Search
USPC .................... 384/477, 484; 277/551, 554, 577
See application file for complete search history.

(56) References Cited

U.S. PATENT DOCUMENTS

| 2,208,482 | A | | 7/1940 | Victor | |
|---|---|---|---|---|---|
| 2,334,349 | A | * | 11/1943 | Mika | 277/577 |
| 2,362,843 | A | * | 11/1944 | Northup | 277/577 |
| 2,565,190 | A | | 8/1951 | Winkeljohn | |
| 3,746,351 | A | | 7/1973 | Tucker, Jr. | |
| 3,871,665 | A | * | 3/1975 | Burke et al. | 277/560 |
| 4,015,883 | A | * | 4/1977 | Taylor | 384/484 |
| 5,186,547 | A | * | 2/1993 | Muhl et al. | 384/480 |
| 6,357,757 | B1 | * | 3/2002 | Hibbler et al. | 277/551 |
| 8,141,882 | B2 | * | 3/2012 | Wang et al. | 277/551 |
| 2002/0012485 | A1 | * | 1/2002 | Zauner et al. | 384/484 |
| 2007/0222161 | A1 | * | 9/2007 | Voydatch et al. | 277/551 |

FOREIGN PATENT DOCUMENTS

| DE | 3205538 C1 | 7/1983 |
|---|---|---|
| DE | 19652001 A1 | 6/1997 |
| DE | 19600125 A1 | 7/1997 |
| GB | 528214 A | 10/1940 |
| GB | 1449220 A | 9/1976 |
| JP | 7269713 A | 10/1995 |

* cited by examiner

*Primary Examiner* — Thomas R Hannon
(74) *Attorney, Agent, or Firm* — Bryan Peckjian; SKF USA Inc. Patent Department

(57) ABSTRACT

A radial shaft seal includes a seal ring connected to a support ring and having a seal lip that extends radially inwardly. A tension spring urges the seal lip radially inward against a seal raceway during operation of the radial shaft seal. A retaining device retains the tension spring and is radially supported on a rigid inner circumferential wall that radially surrounds the tension spring. The retaining device may be configured to at least one of: (i) limit a widening of the diameter of tension spring caused by centrifugal force to a predetermined upper limit and (ii) prevent the tension spring from flying off during operation at high rotational speeds.

12 Claims, 5 Drawing Sheets

RADIAL SHAFT SEAL WITH RETAINING DEVICE FOR A TENSION SPRING

CROSS-REFERENCE

This application claims priority to German patent application no. 10 2010 044 177.5 filed on Nov. 19, 2010, the contents of which are incorporated herein by reference as if fully set forth herein.

TECHNICAL FIELD

The present invention generally relates to a radial shaft seal having a seal lip that is biased radially inward by a tension spring to sealingly contact, e.g., a shaft or axle.

BACKGROUND ART

German Patent Publication No. 196 52 001 A1 and its English-counterpart U.S. Pat. No. 5,845,910 describe an integrated sealing system for an automatic transmission. The sealing system includes a ring-shaped structural element made of metal that is inserted into an annular space between a main output shaft, a semi-shaft and a casing of the automatic transmission. The sealing system also includes a set of radial sealing elements made of rubber, each of which includes a first element having a seal lip that abuts against the main output shaft. A garter spring absorbs radial forces applied to the seal lip. A protective flange is intended to prevent the garter spring from being flung off or detached during operation at high rotational speeds.

SUMMARY

It is an object of the present teachings to disclose an improved radial shaft seal.

In one aspect of the present teachings, a radial shaft seal preferably includes a support ring and a seal ring connected with the support ring. The seal ring includes a seal lip that points radially inward. A tension spring is disposed and configured so as to press or urge the seal lip against a seal raceway that opposes the seal lip in an operational position of the radial shaft seal. A retaining device is configured to retain the tension spring and is radially supported on a rigid inner circumferential wall that radially encircles or surrounds the tension spring.

The rigid circumferential wall can be, e.g., a circumferential wall comprised of a metallic material. For example, the rigid circumferential wall can be formed such that its shape, e.g., the inner diameter of the circumferential wall, does not change or only insubstantially changes when subjected to the influence of centrifugal force, e.g., resulting from a high rotational speed of the circumferential wall or the retaining device. In this aspect of the present teachings, an insubstantial change is understood to mean, e.g., that a change of the diameter of the circumferential wall is less than one-half of the cross-section (e.g., diameter) of the tension spring.

In case the retaining device is supported on a rigid inner circumferential wall that radially encircles or surrounds the tension spring from the outside, a shape change, e.g., a widening of the diameter of the retaining device due to centrifugal forces that can occur during rotation of the retaining device, e.g. at high rotational speeds, can be prevented or at least substantially minimized. As a result, even when subjected to the influence of centrifugal force, the shape of the retaining device remains stable and/or the retaining device at least substantially or even completely maintains its original shape, so that the retaining device maintains its original position relative to the tension spring. Consequently, the retaining capability of the retaining device is improved or is even guaranteed, e.g., even at high rotational speeds.

The retaining device can be configured to prevent the tension spring from falling out of the radial shaft seal assembly. In addition or in the alternative, the retaining device can be configured, e.g., to prevent the tension spring from lifting off and/or detaching from its seat on the seal lip during operation at high rotational speeds.

In another aspect of the present teachings, the radial shaft seal can include a support ring and a seal ring connected with the support ring. The seal ring can include a seal lip that points radially inward. A tension spring is disposed and configured to press or urge the rotating seal lip against a seal raceway that is opposite of the seal lip in an operational position of the radial shaft seal. A retaining device for the tension spring is configured to limit a widening of the diameter of tension spring, which rotates with the seal lip, to a predetermined upper limit, which widening is caused by centrifugal force.

In an operational position of the radial shaft seal ring, the retaining device can be radially outwardly supported over the rigid inner circumferential wall against a static seal seat, on which the radial shaft seal ring is mounted or installed.

The retaining device can be connected with the support ring. The retaining device can be disposed, e.g., between the tension spring and the support ring in the radial direction. The retaining device can coaxially surround the tension spring from the outside.

In any of the above- or below-described embodiments, the rigid inner circumferential wall can be formed or defined by an inner wall of the support ring. The support ring can include an axially-extending case wall, which forms a support surface for a static sealing surface of the radial shaft seal ring, and a radially-extending annular wall. The seal ring is affixed to a terminal end of the radially-extending annular wall that points radially inward. The terminal end forms or defines the inner diameter of the support ring.

In any of the above- or below-described embodiments, the retaining device can include an annular, e.g., elastomeric insert that is inserted between the inner circumferential wall and the tension spring in the radial direction. The retaining device can be formed, e.g., from or as an elastomeric ring inserted between the support ring and the tension spring.

The insert and/or elastomeric ring can be designed to partially fill a radial space between the inner circumferential wall and the tension spring while leaving an annular gap between the insert (or elastomeric ring) and the tension spring. The breadth of the annular gap is preferably less than the diameter of the tension spring, more preferably less than 80% of the diameter of the tension spring. The insert and/or elastomeric ring can be inserted or press-fit into the inner circumferential wall, or can be vulcanized onto the inner circumferential wall.

The retaining device, e.g., the insert or elastomeric ring, can include a contoured radial inner side that faces the tension spring and that is at least partially matched to the outer cross-section of the tension spring. For example, if a conventional tension spring having a circular cross-section (e.g., a garter spring) is utilized to inwardly bias the seal lip, the contoured radial inner side preferably has a circular arc-shape in cross-section. In this case, the breadth of the gap between the retaining device and the tension spring is at least substantially uniform in the axial direction of the radial shaft seal. The annular gap is also preferably uniform in the radial or circumferential direction of the radial shaft seal.

In a particularly preferred embodiment, the contoured radial inner side can be formed as a groove, which encircles the tension spring while leaving or providing a uniform gap relative to the tension spring over at least a portion of the outer surface of the insert or elastomeric ring in the axial direction. The groove preferably has a circular-arc cross-section.

Thus, in any of the above- or below-described embodiments, the retaining device can include a contoured annular groove that is at least at least substantially matched to the outer cross-section of the annular tension spring. The groove can be formed to surround the tension spring while leaving a uniform gap over a portion of its outer surface.

In an alternative or supplemental embodiment to an insert and/or an elastomeric ring, the retaining device can include a metal ring inserted between the inner circumferential wall and the tension spring. The metal ring can be disposed, e.g., between the support ring and the tension spring.

The metal ring forming the retaining device can, if desired, also be formed as a bulge or flange of the support ring, preferably a radially-extending flange that extends from an axially-extending case wall of the support ring. In this case, the support ring may include two parallel walls extending in the radial direction, which walls surround the tension spring in the axial direction of the radial shaft seal. The axially-extending wall of the support ring will surround the tension spring in the radial direction. Further, the tension spring is seated on the seal lip, which is disposed on the opposite side of the axially-extending wall of the support ring. Thus, in such an embodiment, the tension spring is completely surrounded by the combination of the support ring and the seal lip such that the tension spring is prevented from flying out of the radial shaft seal, even at high rotational speeds.

In addition or in the alternative, the metal ring can include an axially-extending case wall supported on the inner circumferential wall and a radially-extending annular end wall (flange). The annular end wall can be offset relative to, or spaced from, the tension spring in the axial direction of the radial shaft seal. A free terminal end of the annular end wall of the metal ring preferably extends axially adjacent to the seal ring and radially inward at least up to an inner diameter of the tension spring. That is, the free terminal end is preferably disposed more radially inward than the inner diameter of the tension spring, so that the annular end wall serves as an enclosure to prevent the tension spring from flying off and out of the bearing assembly at high rotational speeds. That is, in such an embodiment, the tension spring is axially disposed between the respective radially-extending walls of the support ring and the metal ring.

In another aspect of the present teachings, a bearing assembly may include an axis (e.g., an axle) or a shaft having a seal raceway, a rotatable hub or an outer ring of a roller bearing having a seal seat, as well as a radial shaft seal ring according to the present teachings disposed on the seal seat between the hub or outer ring and the axis or shaft.

The axis or shaft of an inner ring of a roller bearing and/or the hub of an outer ring of a roller bearing can be formed in the bearing assembly. In the alternative, the axis or shaft having an inner ring of a roller bearing and/or the hub having an outer ring of a roller bearing can be connected in the bearing assembly.

The radial shaft seal ring of the bearing assembly can also comprise an auxiliary (protective) lip that is axially spaced from the (main) seal lip.

An annular space, which is defined by the main seal lip and the auxiliary protective lip, can be filled with roller bearing grease in order to increase the sealing effect of the radial shaft seal against the shaft or axle.

In another aspect of the present teachings, the retaining devices according to the present teachings can enable shaft seal rings to be utilized at rotational speeds higher than would ordinarily be permitted without the retaining device.

That is, known radial shaft seals suffer from the problem that the seal lip may lift up from its sealing surface due to the centrifugal speed at rotational speeds above the usual allowable limit for the radial shaft seal. At minimum, this lifting may cause leakage of oil or grease out of the bearing and/or contamination to enter into the bearing.

In addition, when subjected to the same centrifugal force, the tension spring, i.e. the coil spring, may also widen or expand outwardly in the radial direction. In fact, when the rotational speed and/or centrifugal force increases above the allowable limit, the tension spring can be flung off from the seal lip due to the high centrifugal force. For example, in many two-lipped radial shaft seal designs, the seal lip may lift and the tension spring may widen at about 8,000 revolutions per minute. This lifting and widening is dependent not only on the centrifugal force, but also on the oil pressure conditions within the bearing.

This problem of the known art can be overcome by providing a retaining device according to the present teachings in the radial shaft seal in order to provide an auxiliary or supplemental retaining function that prevents the tension spring from detaching from the radial shaft seal during high speed operations and also optionally prevents the seal lip from lifting away from the shaft or axle, with which it is normally in sealing contact, at rotational speeds higher than the usual limit for the radial shaft seal. Thus, with such a retaining device, the rotating radial shaft seal ring can be utilized above the generally conventional rotational speed limits of about 6,000 to 8,000 revolutions per minute, without leading to leakages. In fact, in certain applications of the present teachings, rotational speeds of about 15,000 revolutions per minute can now be achieved, without leakages occurring.

Such radial shaft seals also preferably include the auxiliary protective lip, e.g., a secondary oil seal lip or a dust lip, in addition to the primary oil seal lip.

Further objects, embodiments, advantages and designs will be explained in the following with the assistance of the exemplary embodiments and the appended Figures.

DETAILED DESCRIPTION OF THE INVENTION

Figure 1:
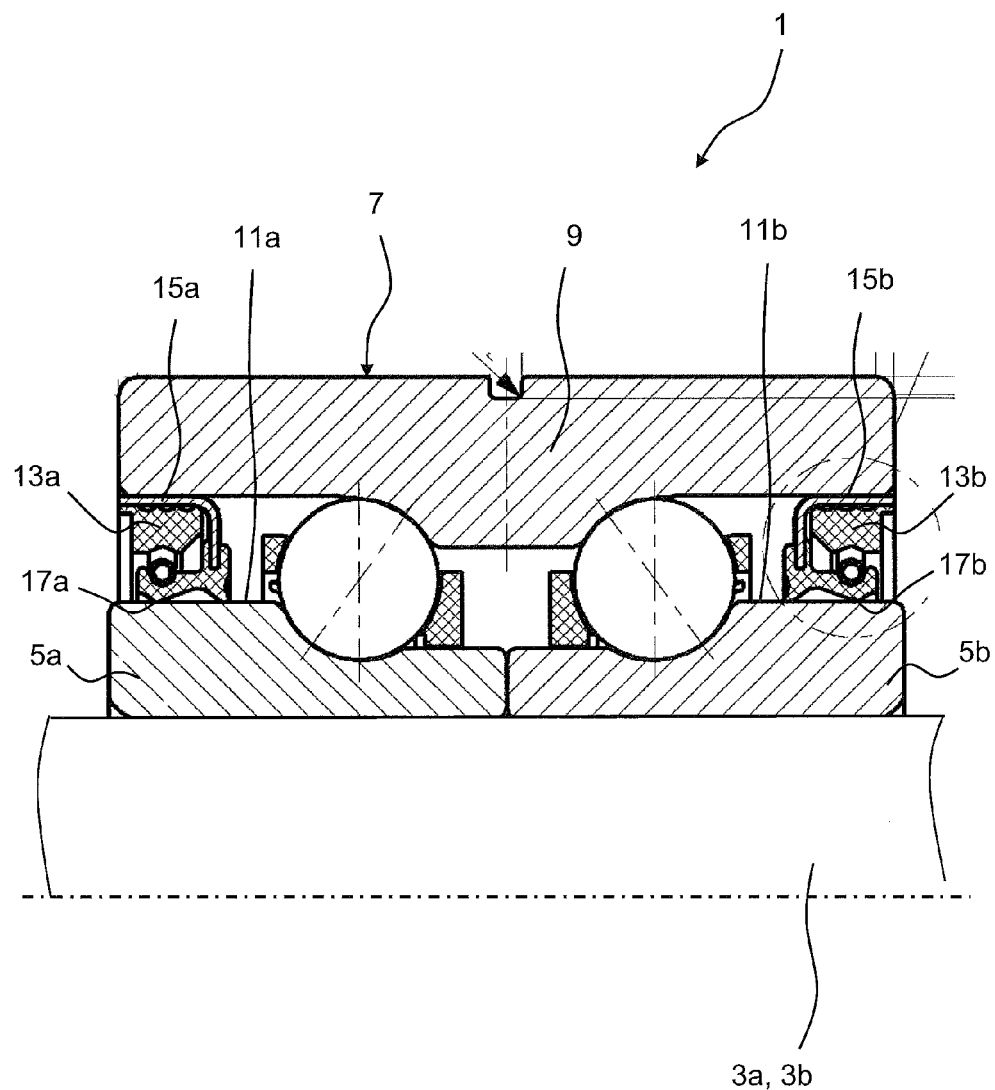
FIG. 1 shows a view in half-section of an exemplary roller bearing assembly having a radial shaft seal and a first embodiment of a retaining device with an elastomeric insert (ring).

The exemplary bearing assembly 1 illustrated in FIG. 1 includes an axis or axle 3a and/or a shaft 3b, on which for example two inner rings 5a, 5b of a two-row roller bearing 7 sit. In this embodiment, the two-row roller bearing 7 also includes a common outer ring 9. Each inner ring 5a, 5b defines a seal raceway 11a, 11b designed to contact a seal lip 17a, 17b of a radial shaft seal 13a, 13b, as will be further described below. In the first representative embodiment, a first radial shaft seal 13a is inserted between the outer ring 9 and the inner ring 5a depicted on the left in FIG. 1. Likewise, a second radial shaft seal 13b is inserted between the outer ring 9 and the inner ring 5b depicted on the right in FIG. 1. In the first representative embodiment, the axis 3a is formed in an immobile or stationary manner, so that the inner rings 5a, 5b sitting on the axis 3a are also immobile or stationary. Accordingly, the outer ring 9 is rotatably borne, i.e. the outer ring 9 is rotatable about the stationary axle 3a or shaft 3b. In such an embodiment, the outer ring 9 forms a rotatable hub having a static sealing seat 15a, 15b for each of the two radial shaft seals 13a, 13b. Consequently, the two radial shaft seals 13a, 13b will rotate together with the outer ring 9. Thus, the rotating seal lips 17a, 17b will slide on the respective counter faces defined on the respective inner rings 5a, 5b, i.e. on the respective seal raceways 11a, 11b.

Figure 2:
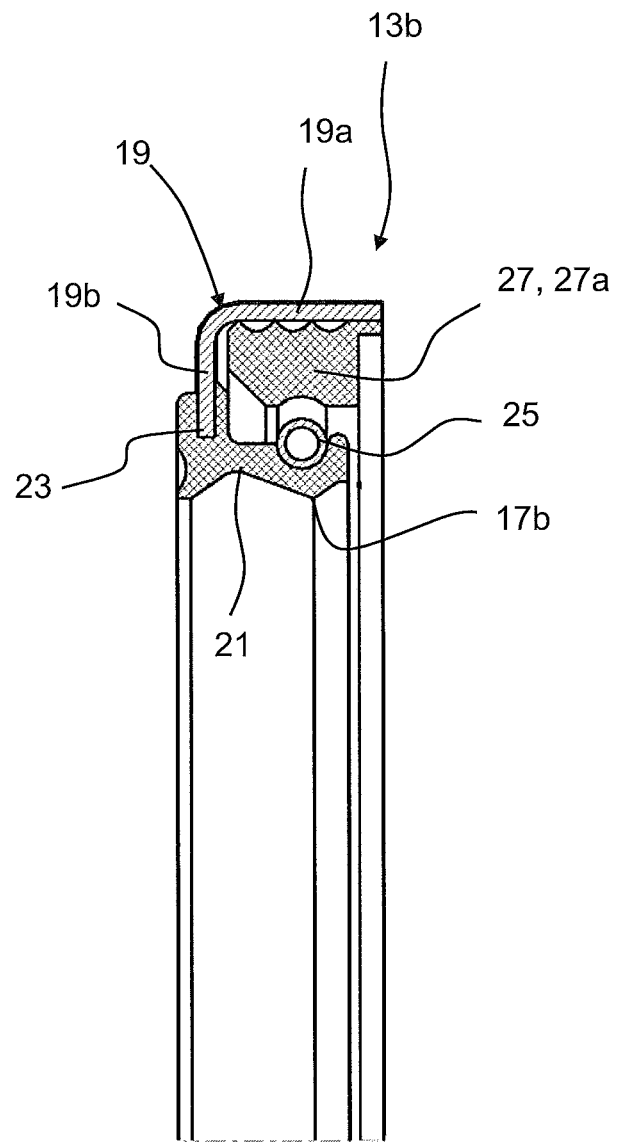
FIG. 2 shows a view in half-section of the radial shaft seal according to FIG. 1.

In FIG. 2, one of the two radial shaft seals 13a, 13b, is shown in isolation. The radial shaft seal 13b includes a support ring 19 and a seal ring 21 connected to the support ring 19.

The support ring 19 includes an axially-extending case wall 19a, which forms or defines e.g., a supporting surface for the static sealing seat 15b of the radial shaft seal 13b. The support ring 19 further includes a radially-extending annular wall 19b connected to the axially-extending case wall 19a. The seal ring 21 is affixed onto the radially inward-pointing end 23 thereof, which end 23 forms or defines the inner diameter of the support ring 19.

The seal ring 21 carries the radially-inward-pointing seal lip 17b. A tension spring 25 is associated with the seal lip 17b. The tension spring 25 is formed or configured to press or urge the seal lip 17b against the seal raceway 11b, which is opposite of or faces the seal lip 17b in an operational position of the radial shaft seal ring 13b. The tension spring 25 may be embodied as a garter spring, i.e. a coil spring connected at its axial ends to form a ring structure, as is well known in the radial shaft seal art.

The radial shaft seal 13b also includes a retaining device 27 that serves to retain the tension spring 25 at high rotational speeds.

Figure 3:
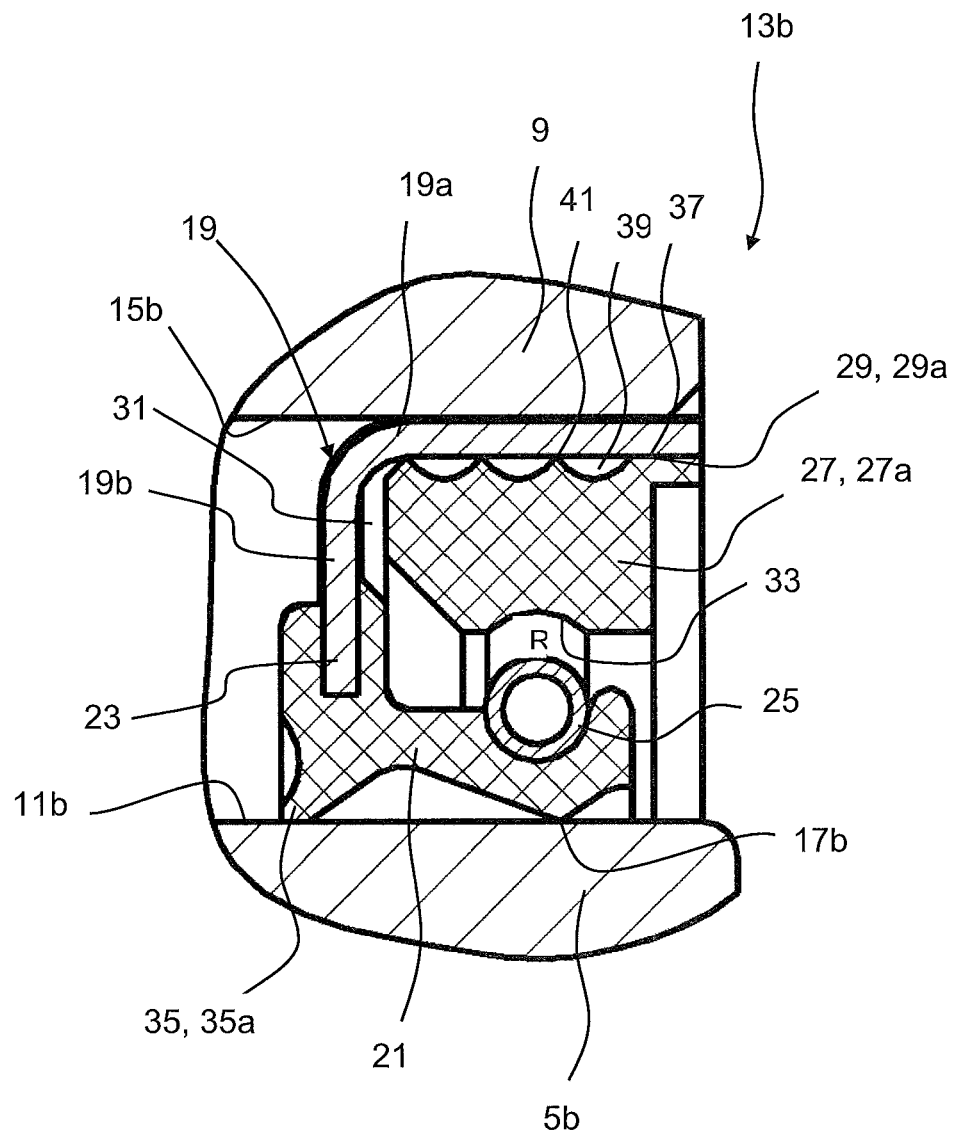
FIG. 3 shows an enlarged partial cross-sectional view of the radial shaft seal according to FIG. 1.
Figure 5:
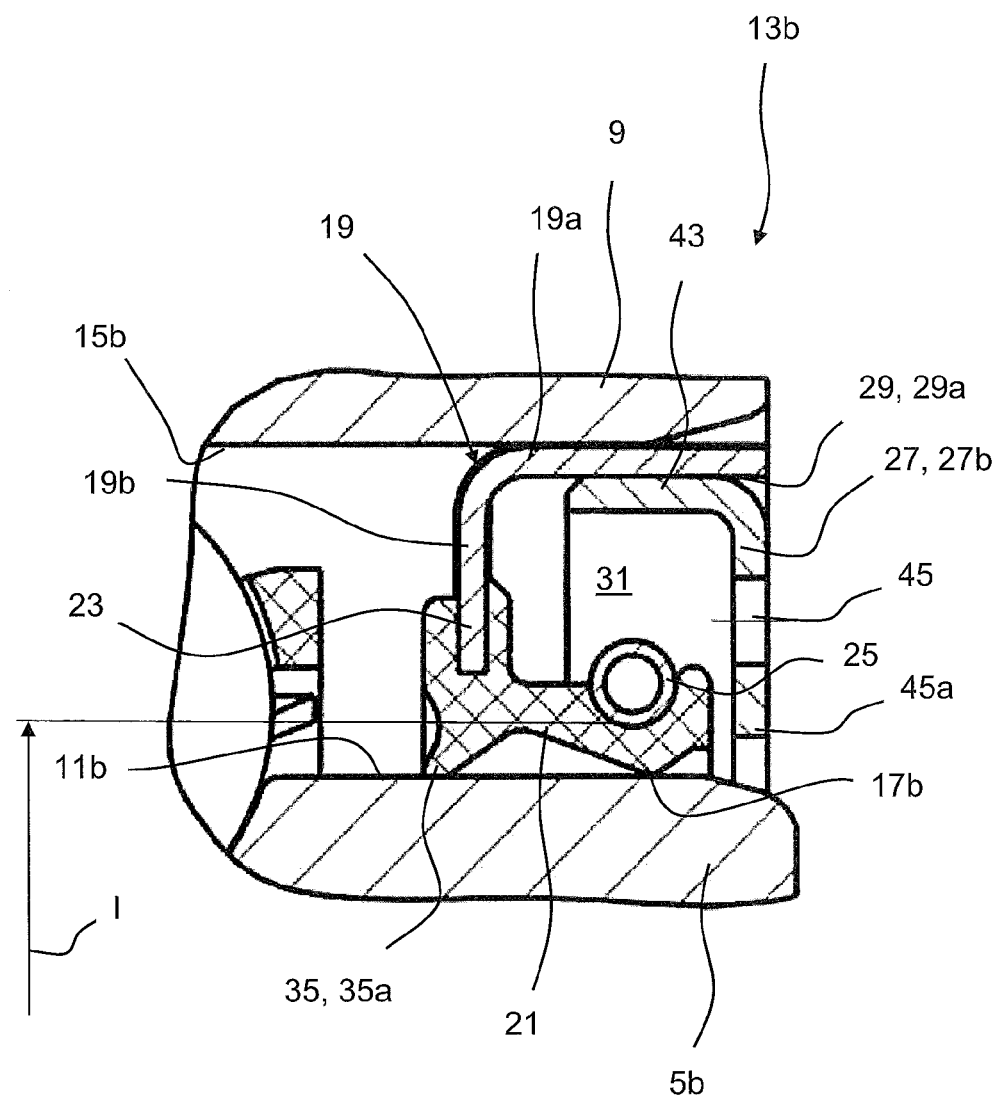
FIG. 5 shows an enlarged partial cross-sectional view of the radial shaft seal according to FIG. 4.

In FIG. 3, a first representative embodiment of the retaining device 27 is shown in an enlarged manner. In addition, FIG. 5 shows a second representative embodiment of the retaining device 27 in an enlarged manner.

As is illustrated in FIG. 3, the first representative retaining device 27 is radially supported on a rigid inner circumferential wall 29, which radially encircles or surrounds the tension spring 25 from the outside. In this exemplary embodiment, the inner circumferential wall 29 is formed by an inner wall 29a of the support ring 19 and/or the inner side of the case wall 19a of the support ring 19.

In the first embodiment, the retaining device 27 includes an annular, e.g., elastomeric insert (ring) 27a, which is inserted between the inner circumferential wall 29 or the inner wall 29a of the support ring 19 and the tension spring 25 in the radial direction.

The elastomeric insert 27 is designed to partially fill the space in the radial direction between the inner circumferential wall 29 or the inner wall 29a of the support ring 19 and the tension spring 25. As a result, an annular gap R in the radial direction is defined between the wall 29 or 29a and the radially outer surface of tension spring 25. The annular gap R has a breadth or width that is preferably less than the diameter of the tension spring 25. The annular gap R may be 90% or less, 80% or less, 70% or less, 60% or less or 50% or less of the diameter of the tension spring 25. The width of the annular gap R may be suitably selected depending upon the particular application of the present teachings and may be designed so as to be large enough to avoid frictional contact during normal rotation, while still being small enough to prevent the tension spring 25 from widening and possibly detaching from the seal lip 17a, 17b at high rotational speeds. Such a widening of the tension spring 25 could cause leakage of lubricant out of the bearing assembly 1 in case the seal lip 17a, 17b lifts away from the seal raceway 11a, 11b. Therefore, the annular gap R preferably may be selected so as to provide an upper limit to the widening of the diameter of the tension spring 25 during operation.

The retaining device 27 (i.e. the elastomeric insert or ring 27a in this embodiment) preferably has a contoured radial inner side 33 facing towards the tension spring 25 that is at least substantially matched to the outer cross-section of the tension spring 25. For example, if a torus-shaped garter spring is utilized as the tension spring 25, the radial inner surface 33 of the retaining device 27 preferably has a circular arc-shaped groove that has the same, or at least substantially the same, radius of curvature as the outer periphery or outer circumference of the garter spring. In this case, the annular gap R between the groove and the outer circumferential surface of the garter spring will be uniform across the axial direction of the radial shaft seal.

The radial shaft seal 13b may optionally include an auxiliary seal lip 35, e.g., a protective lip 35a, in addition to the seal lip 17b that serves as the primary oil seal lip for the radial shaft seal 13b. Grease, e.g. roller bearing grease, can be introduced between the primary seal lip 17b and the auxiliary seal lip 35a for additional sealing.

In the illustrated embodiment, grooves 39 and/or projections 41 can be defined on the radially outer circumferential surface 37 of the elastomeric insert 27a in order to increase the sealing force between the elastomeric insert 27a and the inner wall 29a of the support ring 19 or the inner side of the case wall 19a of the support ring 19.

Figure 4:
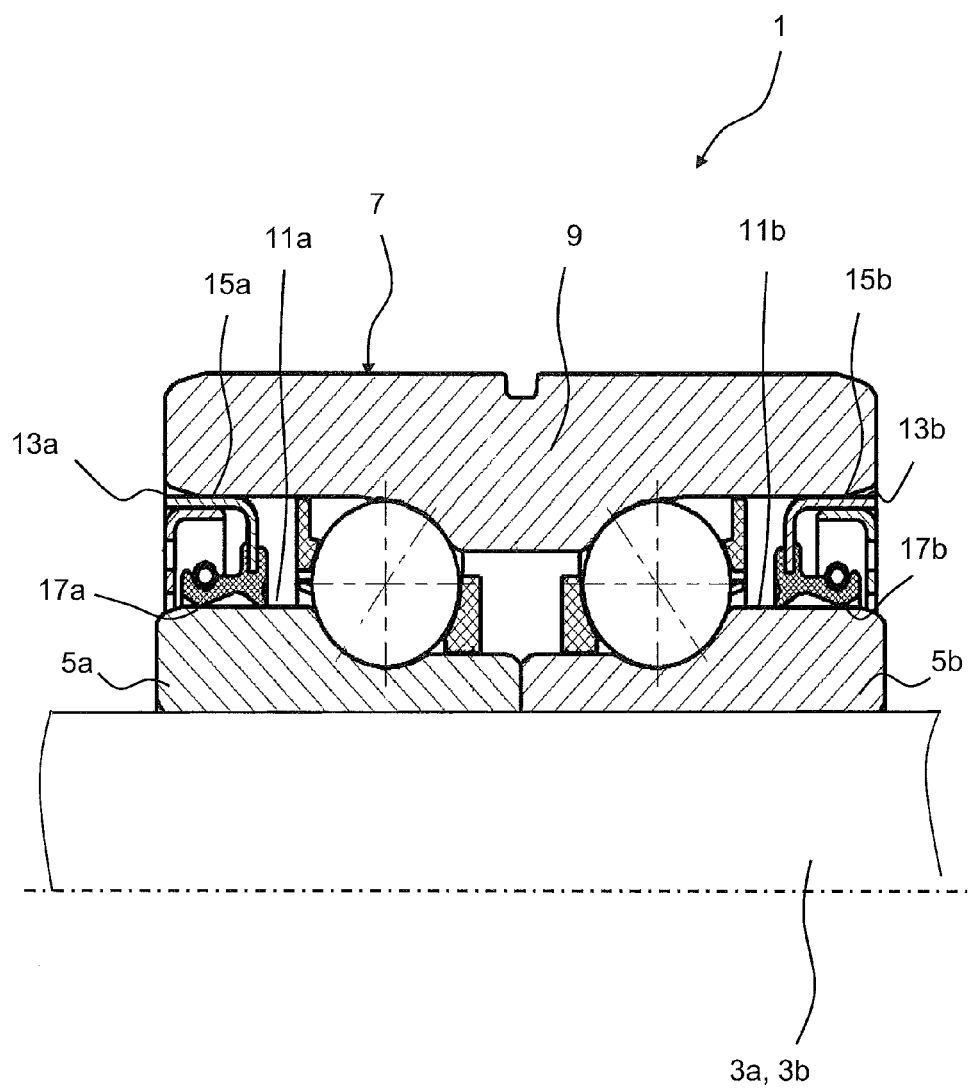
FIG. 4 shows a view in half-section of an exemplary roller bearing assembly having a radial shaft seal and a second embodiment of a retaining device with a metal ring.

The second representative bearing assembly 1 illustrated in FIG. 4 includes, analogous to FIG. 1, an axle 3a or shaft 3b, on which two inner rings 5a, 5b of a two-row roller bearing 7 sit. In this embodiment as well, the two-row roller bearing 7 includes a common outer ring 9. Each inner ring 5a, 5b has a seal raceway 11a, 11b. In the second representative embodiment, a first radial shaft seal ring 13a is inserted between the outer ring 9 and the inner ring 5a depicted on the left in FIG. 4. Likewise, in the second representative embodiment, a second radial shaft seal ring 13b is inserted between the outer ring 9 and the inner ring 5b depicted on the right in FIG. 4. Similar to the first representative embodiment, the axle 3a or shaft 3b is formed in an immobile manner, i.e. it is stationary during operation, so that the inner rings 5a, 5b sitting on the axle 3a or shaft 3b are also immobile or stationary during operation. Accordingly, the outer ring 9 is rotatably borne about the stationary axle 3a or shaft 3b. For example, the outer ring 9 may form a rotatable hub having a static sealing seat 15a, 15b for each of the two radial shaft seals 13a, 13b. Consequently, the two radial shaft seals 13a, 13b will rotate together with the outer ring 9. Thus, the seal lips 17a, 17b will slide on the counter faces defined on the respective inner rings 5a, 5b, i.e. on the respective seal raceways 11a, 11b.

The second embodiment of a radial shaft seal ring 13a, 13b illustrated in FIG. 5 differs from the first embodiment according to FIG. 3 in that the elastomeric insert 27a is replaced by a metal ring 27b.

The retaining device 27, i.e. the metal ring 27b in this embodiment, is radially supported on a rigid inner circumferential wall 29, which radially encircles or surrounds the tension spring 25 from the outside. In this embodiment as well, the inner circumferential wall 29 is formed by an inner wall 29a of the support ring 19 or the inner side of the case wall 19a of the support ring 19. However, it should be understood that another rigid or substantially inflexible material or part may be disposed between the inner wall 29a of the support ring 19 and the retaining device 27 in any of the embodiments disclosed herein.

The radial shaft seal 13b may again include an auxiliary lip 35, e.g., a protective lip 35a, in addition to the seal lip 17b that serves as the primary oil seal lip. Grease, e.g., roller bearing grease, can be introduced between the primary seal lip 17b and the auxiliary lip 35a for additional sealing.

Thus, the retaining device 27 of the second representative embodiment includes the metal ring 27b inserted between the inner circumferential wall 29 and the tension spring 25 in the radial direction.

The metal ring 27b includes an axially-extending outer wall 43, which is supported on the inner circumferential wall 29, and a radially-extending annular end wall 45 extending therefrom.

The annular end wall 45 is disposed so as to be axially offset relative to the tension spring 25. In the illustrated embodiment, the annular end wall 45 has a free terminal end 45a that extends axially adjacent to the seal ring 21 and radially inward at least up to the inner diameter I of the tension spring 25. That is, the annular end wall 45 may extend inwardly in the radial direction closer to the center axis of the shaft 3b than the inner diameter I of the tension spring 25 or about equal with the inner diameter I. As a result, the support ring 29 and the metal ring 27b together define an enclosure for the tension spring 25 in the axial direction that will prevent the tension spring from flying off of the seal lip 17a, 17b at high rotational speeds, thereby providing a safer operation and reducing the likelihood of leakages at high rotational speeds.

Various modifications of the present teachings are possible without departing from the scope and spirit of the present invention.

For example, in the representative embodiments shown in FIGS. 1 and 4, the two radial shaft seals are installed such that each primary oil seal 17a, 17b is located on an axially outer end of the axle 3a or shaft 3b that faces the outer environment, i.e. on the "air side" of the bearing 1. Consequently, the secondary or auxiliary lip 35, 35a is located on the axial side of the radial shaft seal that is closest to the roller bodies (the not-numbered balls shown in FIGS. 1 and 4), i.e. on the "oil side" of the bearing 1. In this arrangement, the auxiliary lip 35, 35a thus serves as a supplemental oil seal lip.

However, it should be understood that the radial shaft seals may be installed in the inverse relationship such that the primary oil seal lips 17a, 17b are located on the oil side of the bearing 1 and the auxiliary seal lips 35, 35a are located on the air side of the bearing 1. In this case, the auxiliary seal lips 35, 35a may serve as dust lips, as is well known in the radial shaft seal art in order to block dust, dirt and/or moisture from entering into the sealed lubrication chamber defined by the primary seal lips 17a, 17b.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved radial shaft seals and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
3a Axis (axle)
3b Shaft
5a, 5b Inner ring
7 Roller bearing
9 Outer ring
11a, 11b Seal raceways
13a, 13b Radial shaft seals
15a, 15b Seal seats
17a, 17b Seal lips
19 Support ring
21 Seal ring
23 End
25 Tension spring
27 Retaining device
27a Elastomeric insert (ring)
27b Metal ring
29 Inner circumferential wall
29a Inner wall
31 Space
35 Auxiliary lip
35a Protective lip
37 Outer circumferential surface
39 Grooves
41 Projections
43 Outer wall
45 Annular end wall
45a Terminal end
R Annular gap
I Inner diameter

The invention claimed is:

1. A radial shaft seal comprising:
a support ring,
a seal ring connected to the support ring and having a seal lip that extends inwardly in the radial direction of the radial shaft seal,
a tension spring configured to press the seal lip against a seal raceway during operation of the radial shaft seal, and
a retaining device configured to retain the tension spring, the retaining device being radially supported on a rigid inner circumferential wall that radially surrounds the tension spring, wherein the retaining device includes an annular elastomeric insert disposed between the inner circumferential wall and the tension spring in the radial direction.

2. The radial shaft seal according to claim 1, wherein the rigid inner circumferential wall is defined by a radially inner wall of the support ring.

3. The radial shaft seal according to claim 1, wherein:
the annular elastomeric insert partially fills a space in the radial direction between the inner circumferential wall and the tension spring,
an annular gap is defined between a radially inner surface of the annular elastomeric insert and a radially outer surface of the tension spring, and
the annular gap has a width that is less than the diameter of the tension spring.

4. The radial shaft seal according to claim 3, wherein the radially inner surface of the annular elastomeric insert is contoured so as to at least substantially match to an outer cross-section of the tension spring.

5. The radial shaft seal according to claim 4, wherein the radially inner surface of the annular elastomeric insert has a groove that radially surrounds the tension spring and defines a uniform circumferential gap between the annular elastomeric insert and the tension spring over at least a portion of the radially outer surface of the tension spring.

6. The radial shaft seal according to claim 5, wherein the rigid inner circumferential wall is defined by a radially inner wall of the support ring.

7. A bearing assembly comprising:
an inner ring defining a seal raceway,
an outer ring defining a seat,
a plurality of roller bodies disposed between the inner and outer rings, and
the radial shaft seal of claim 1, wherein the support ring is statically seated on the seat of the outer ring and the seal lip sealingly contacts the seal raceway of the inner ring.

8. A radial shaft seal comprising:
a support ring,
a seal ring connected to the support ring and having a seal lip that extends inwardly in the radial direction of the radial shaft seal,
a tension spring configured to bias the seal lip radially inward, the tension spring having a diameter, and the tension spring is a garter spring,
a retaining device configured to limit a widening of the diameter of tension spring caused by centrifugal force to a predetermined upper limit, the retaining device being radially supported on a rigid inner circumferential wall that surrounds the tension spring in the radial direction,
the retaining device comprises an elastomeric ring disposed between the rigid inner circumferential wall and the garter spring,
an annular gap is defined in the radial direction between a radially inner surface of the elastomeric ring and a radially outer surface of the garter spring, and
the annular gap has a width that is less than the diameter of the garter spring.

9. The radial shaft seal according to claim 8, wherein:
the radially inner surface of the elastomeric ring has a circular arc-shaped groove that surrounds the garter spring in the radial direction and
the annular gap between the groove and the radially outer surface of the garter spring is constant over at least a portion of the radially outer surface of the garter spring in an axial direction of the radial shaft seal.

10. The radial shaft seal according to claim 9, wherein the radially outer surface of the garter spring and the groove have the same radius of curvature.

11. The radial shaft seal according to claim 10, wherein the width of the annular gap is less than 80% of the diameter of the garter spring.

12. A bearing assembly comprising:
an inner ring defining a seal raceway,
an outer ring defining a seat,
a plurality of roller bodies disposed between the inner and outer rings, and
the radial shaft seal of claim 8, wherein the support ring is statically seated on the seat of the outer ring and the seal lip sealingly contacts the seal raceway of the inner ring.

* * * * *